United States Patent [19]

Rosinski et al.

[11] Patent Number: 4,837,074
[45] Date of Patent: Jun. 6, 1989

[54] THERMOFORMED POLYOLEFIN ARTICLES HAVING IMPROVED GLOSS

[75] Inventors: Richard J. Rosinski, Lake Jackson; Robert R. Milks, Angleton, both of Tex.

[73] Assignee: The Dow Chemical Company, Midland, Mich.

[21] Appl. No.: 82,605

[22] Filed: Aug. 6, 1987

[51] Int. Cl.$^4$ .................... C08L 23/00; C08L 27/16; C08L 27/30; B32B 27/08
[52] U.S. Cl. .................................. 428/220; 428/409; 428/422; 428/515; 525/199
[58] Field of Search ............... 428/220, 422, 409, 515; 264/210.1; 525/199

[56] References Cited

U.S. PATENT DOCUMENTS

| | | | |
|---|---|---|---|
| 4,317,860 | 3/1982 | Strassel | 428/420 |
| 4,574,104 | 3/1986 | Aishima et al. | 428/220 |

*Primary Examiner*—Allan M. Lieberman

[57] ABSTRACT

Thermoformed polyolefin articles with improved gloss and method of making the same. A polyolefin such as LDPE, HDPE, LLDPE or PP is compounded with up to 3000 ppm, e.g. 800–1500 ppm, fluoroelastomer and thermoformed into an article with improved gloss. The fluoroelastomer is generally amorphous, soluble in organic solvents and has a Tg of 20° C. or less, such as vinylidene fluoride/hexafluoropropylene copolymer. The article may be compositionally uniform, or formed from a coextruded sheet with a cap layer containing the gloss additive and a base layer without the additive.

14 Claims, No Drawings

THERMOFORMED POLYOLEFIN ARTICLES HAVING IMPROVED GLOSS

FIELD OF THE INVENTION

The present invention relates to articles manufactured from polyolefins by the thermoforming process having improved gloss, and also to a thermoforming process for polyolefins in which the reduction in gloss during the thermoforming process is reduced.

BACKGROUND OF THE INVENTION

Thermoforming of polyolefins is well known. Generally, a sheet of the polyolefin is formed or shaped by heating the sheet above the softening temperature of the polyolefin, fitting the sheet along the contours of a mold with pressure supplied by vacuum or other force, and removing the shaped article from the mold after cooling below its softening point.

A common problem heretofore in thermoforming polyolefins is that polyolefins lose much of their gloss during the thermoforming process. Gloss is the geometrically selective reflectance of a surface responsible for its shiny and lustrous appearance. Gloss is an important property in applications in which a shiny or lustrous appearance is desirable, such as, for example, the manufacture of liners in the home appliance industry.

It has been known to employ polymer processing aids in the extrusion of polyolefins. Such processing aids are added to inhibit melt fracture of the polyolefins during extrusion at a high rate of extrusion. Examples of such extrusion processing additives are disclosed in U.S. Pat. Nos. 3,125,547; 3,459,834; 4,334,037; 3,334,157; and 3,005,795. However, extrusion is a dynamic process and as far as applicant is aware, fluoroelastomers have not heretofore been employed in static processes such as thermoforming.

SUMMARY OF THE INVENTION

Broadly, the present invention provides a thermoformed polyolefin article with improved gloss. The article has at least a surface layer comprising polyolefin blended with an effective amount of fluoroelastomer.

The present invention also provides a thermoformed polyolefin article with improved gloss which has a cap layer of polyethylene or polypropylene blended with 100 to 3000 ppm of fluoroelastomer having a Tg of 20° C. or less and selected from polymers and copolymers of hexafluoropropylene, vinylidene fluoride and combinations thereof; and a base layer of HDPE, LDPE, LLDPE or PP coextruded with the cap layer; the layers being formed into the desired shape by a vacuum forming process.

The present invention also provides an article prepared by a method which includes: (a) coextruding a polyomlefin sheet having a base layer and a cap layer, the cap layer containing 100-3000 ppm fluoroelastomer having a Tg of 20° C. or less; (b) heating the sheet to or above its softening temperature; (c) fitting the heated sheet to the contours of a mold; (d) cooling the fitted sheet to below its softening temperature to form a shaped article; and (e) removing the shaped article from the mold.

DESCRIPTION OF THE INVENTION

It has been discovered that gloss retention is unexpectedly improved when an article is thermoformed from a polyolefin sheet having at least a surface layer of polyolefin blended with fluoroelastomer.

Suitable polyolefins for the surface layer include HDPE, LDPE, LLDPE and PP. Low density polyethylene ("LDPE") is generally a branched polymer prepared by free radical catalyst at high pressures. High density polyethylene ("HDPE") is generally a linear polymer prepared at lower pressures with a coordination catalyst such as Ziegler or Natta catalyst. Linear low density polyethylene ("LLDPE") is also a linear polymer, but contains interpolymerized olefins other than ethylene in sufficient quantities to appreciably reduce density into the range typical for low density polyethylene. Polypropylene ("PP") is generally a crystalline polymer obtained by polymerizing propylene with a stereospecific catalyst, although other catalysts are sometimes employed. In general, the suitable polyolefins include polymers of ethylene and propylene; however, it is readily appreciated that the polyolefin may contain relatively minor proportions of olefins and other monomers which are interpolymerizable with ethylene and/or propylene.

The polyolefin of the surface layer must be one which is thermoformable. Thermoformable polyolefins generally have a melt index in the range of from about 0.01 to about 10, preferably from about 0.5 to about 1, and ideally from about 0.1 to about 0.5. As used herein, melt index is determined according to ASTM D-1238, condition E (190° C./2.16 kg). The preferred polyolefin for the surface layer is HDPE.

The fluoroelastomer additive described herein is distinguished from the non-elastomeric, particulated fluorocarbon polymers generally disclosed in the above-mentioned U.S. patents. The fluoroelastomer blended with the polyolefin in the surface layer may be any elastomeric polymer containing fluorine. The fluoroelastomers as a class are generally amorphous and soluble in organic solvents such as acetone, acrylonitrile, methyl ethyl ketone, dimethyl sulfoxide and the like. They generally have a glass transition temperature (Tg) of about 20° C. or less, preferably −20° C. or below. A suitable fluoroelastomer in the present invention is a copolymer of vinylidene fluoride and hexafluoropropylene. Exemplary of such commercially available fluoroelastomers are copolymers of vinylidene fluoride and hexafluoropropylene obtained under the designations Viton A, Dynamar PPA-2231 and Tecnoflon NM. Other elastomeric copolymers may contain from 5 to 70 weight percent hexafluoropropylene, preferably from about 30 to about 70 weight percent hexafluoropropylene.

The fluoroelastomer is blended with the polyolefin in the surface layer in at least an amount effective to improve gloss retention during thermoforming up to 0.3 weight percent of the blend. Above this proportion, there is generally little or no marginal improvement in gloss retention during thermoforming. The fluoroelastomer is preferably present in the surface layer at 100 to 3000 ppm, and especially at 800 to 1500 ppm.

In addition, the surface layer blend of polyolefin and fluoroelastomer may optionally contain various additaments conventionally present in thermoformed polyolefins in proportions which do not substantially adversely affect thermoformability or gloss retention. Such additives may include fillers, colorants, antioxidants, thermal stabilizers, ultraviolet stabilizers and like additives. Exemplary fillers are finely divided inorganics such as talc, clay, silica, metal oxides and the like. Inorganics as fillers may generally comprise up to about 50 weight percent of a thermoformable polyolefin blend, but preferably are not present in the surface layer since they tend to reduce the effectiveness of the fluoroelastomer in enhancing gloss during thermoforming.

The thermoformed article may be compositionally uniform, i.e. comprise only the polyolefin/fluoroelastomer blend, or alternatively may be made from a coextruded sheet having a polyolefin base layer and a cap layer or layers of polyolefin containing the fluoroelastomer additives for improved gloss retention. The base layer may be any thermoformable polyolefin such as LDPE, HDPE, LLDPE, PP or the like with the melt indices described hereinabove, and may also contain additives conventionally employed in thermoformed polyolefins.

The overall thickness of the coextruded sheet should be sufficient to facilitate thermoforming, generally at least 1.8 mm. The cap layer containing the gloss retention additive should be at least 0.25 mm, and preferably has a thickness of 0.25–0.51 mm.

The coextruded polyolefin sheet may be prepared according to well-known methods such as, for example, mmultilayer extrusion. The cap layer polyolefin containing the fluoroelastomer additive may be prepared by mixing the polyolefin directly with the desired proportion of fluoroelastomer, or it may be prepared by blending with a concentrated masterbatch of the fluoroelastomer.

The thermoforming method of the invention may be carried out on equipment conventionally employed for vacuum forming processes. Generally, the sheet of polyolefin containing the fluoroelastomer as described hereinabove is heated to or above its softening temperature, such as for example in an oven. The heated sheet is then fitted to the contours of a mold by suitable means, for example by plug assistance or by applying pressure or vacuum. After the sheet is cooled below its softening temperature to form an article shaped to correspond to the mold, the formed article is removed from the mold.

EXAMPLE

A 2.54 mm polyethylene sheet was coextruded with and without a Viton fluoroelastomer additive in the cap layer and thermoformed for comparison of gloss retention. The base layer was HDPE (0.08 MI, 0.952 g/cc) filled with 30% talc and containing no fluoroelastomer. The cap layer HDPE (0.9 MI, 0.961 g/cc) contained 1000 ppm Viton A fluoroelastomer. In the case of the comparative example, the cap layer contained no fluoroelastomer additive. The base layer was extruded into a feedblock/die assembly with a 38.1 mm ABS type Nelmor extuder at 105 rpm and a melt temperature of 268° C. The cap layer was extruded into the feedblock/die assembly with a 25.4 mm ABS type Nelmor extruder at 97 rpm and a melt temperature of 191° C. The sheet was processed with a 0.305 m flex lip die with a maximum 25.4 mm gap, a polishing roll stack of 3 rolls and a cutter. The resulting sheets had a cap layer of about 0.51 mm and a base layer of about 2.03 mm. The Gardner 60° gloss was 90% for the cap layer without the additive and 88% with the Viton A additive.

The coextruded sheets were then thermoformed on a Brown Co. thermoformer equipped with a plug assisted aluminum female mold measuring 0.305 m by 0.229 m by 0.356 m deep. The plug temperature was 110° C. and the oven temperature 593° C. with a heating time of 115 seconds and a forming time of 70 seconds. The Gardner 60° gloss of the additive-containing cap layer was 55% after thermoforming. In contrast, the gloss of the cap layer without additive was only 35% after thermoforming.

The thermoforming gloss retention capabilities of the fluoroelastomer additive in the present invention are surprising and unexpected. As mentioned above, fluorocarbon polymers have been used to prevent melt fracture in extrusion of polyolefins at high extrusion rates. In addition, the absence of melt fracture has on occasion been verified by a comparison between the optical properties of melt fractured and non-melt fractured polyolefins. However, other than the fact that there is no melt fracture when the fluorocarbon polymers are used during high rate extrusion, there is generally no improvement in optical properties. For example, when an LLDPE film (1.0 MI, 0.920 g/cc) was blown on a 6.35 cm Johnson extruder with an L/D of 24/1 with a 15.24 cm Uniflow die equipped with a Uniflow dual lip air ring for cooling at a melt temperature of 204° C. at about 59.1 kg/hr with a die gap of 1.5 mm (i.e., non-melt fracture conditions) with and without 800 ppm Viton A fluoroelastomer, the film without the additive had a Gardner gloss of 70.6% at 20° and 57.8% at 45° while the film with the additive had a Gardner gloss of 71.6% at 20° and 57.4% at 45°. Thus, the improvement in gloss retention during the present thermoforming process is quite unexpected.

The foregoing description of the invention is illustrative and explanatory thereof. Various changes in the materials, apparatus, and particular steps employed will occur to those skilled in the art. It is intended that all such variations within the scope and spirit of the appended claims be embraced thereby.

We claim:

1. An article of manufacture, comprising:
   a thermoformed article having improved gloss, said article having at least a surface layer comprising a polyolefin having a melt index of from about 0.01 to about 10, as determined according to ASTM D-1238, Condition E, blended with from about 100 to about 3000 parts per million (ppm) of the blend, of a fluoroelastomer having a glass transition temperature (Tg) of 20° C. or less, and being selected from the group consisting of polymers and copolymers of hexafluouropropylene, vinylidene fluoride and blends thereof.

2. The article of claim 1, wherein said polyolefin is selected from the group consisting of: high density polyethylene, low density polyethylene, linear, low density polyethylene, and polypropylene.

3. The article of claim 1, wherein said fluoroelastomer has a glass transition temperature of 20° C. or less, is substantially amorphous and soluble in organic solvents.

4. The article of claim 1, wherein said article comprises a polyolefin base layer, essentially free of fluorocarbon polymer, the polyolefin having a melt index of from about 0.01 to about 10, as determined according to ASTM D-1238, Condition E,
   the article having a sheet thickness of at least about 1.8 mm, with the surface layer having a thickness of at least 0.25 mm.

5. The article of claim 4, wherein said surface layer is from 0.25 to 0.51 mm thick.

6. The article of claim 4, wherein said base layer contains up to about 50 weight percent of a finely divided inorganic filler selected from the group consisting essentially of talc, clay, silica and metal oxides.

7. A thermoformed article having improved gloss, comprising:

a 0.25 to 0.5 mm cap layer comprising high density polyethylene, low density polyethylene, linear, low density polyethylene or polypropylene blended with from 100 to 3000 ppm fluoroelastomer by weight of the blend, said fluoroelastomer having a glass transition temperature of about 20° C. or less and being a copolymer of hexafluoropropylene and vinylidene fluoride; and a base layer coextruded with said cap layer comprising high density polyethylene, low density polyethylene, linear low density polyethylene or polypropylene containing finely divided inorganic as a filler;

said coextruded layers being formed into a shape by a vacuum forming process and having a total thickness of at least about 1.8 mm.

8. The article of claim 7, wherein said fluoroelastomer has a glass transition temperature of −20° C. or below.

9. The article of claim 8, wherein said fluoroelastomer contains from 5 to 70 percent by weight hexafluoropropylene.

10. The article of claim 7, wherein said cap layer comprises from 800 to 1500 ppm of said fluoroelastomer.

11. The article of claim 7, wherein said base layer and said cap layer comprises high density polyethylene.

12. An article prepared by a process comprising the steps of:

(a) coextruding a polyolefin sheet of at least 1.8 mm thick comprising a base layer and a cap layer, the base layer comprising a polyolefin selected from the group consisting essentially of low density polyethylene, high density polyethylenes, having a melt index of from about 0.01 to about 10, said cap layer being about 0.25 to 0.51 mm thick and comprising a blend of said polyolefin and a fluoroelastomer being selected from the group consisting of polymers and copolymers of hexafluoropropylene, vinylidene fluoride and blends thereof, the blend containing 100 to 3000 ppm of said fluoroelastomer, with the fluoroelastomer further having a glass transition temperature of −20° C. or less;

(b) heating said sheet above its softening temperature;

(c) fitting said heated sheet to the contours of a mold;

(d) cooling said fitted sheet to below its softening temperature to form a shaped article; and (e) removing said shaped article from said mold.

13. The article of claim 12, wherein said fluoroelastomer is present in said cap layer at 800 to 1500 ppm.

14. The article of claim 12, wherein said fluoroelastomer contains from about 30 to about 70 percent by weight hexafluoropropylene.

* * * * *

UNITED STATES PATENT AND TRADEMARK OFFICE
CERTIFICATE OF CORRECTION

PATENT NO. : 4,837,074

DATED : June 6, 1989

INVENTOR(S) : Rosinski et al.

It is certified that error appears in the above-identified patent and that said Letters Patent is hereby corrected as shown below:

Col. 1, line 57 ; change "polyomlefin  to --polyolefin--.

Col. 3, line 24; change "mmultilayer" to --multilayer--.

Col. 4, line 47; change "hexafluouropropylene" to --hexafluoropropylene--.

Col. 5, line 5; change "0.5 mm" to --0.51 mm--.

Col. 6, line 2; change "comprises" to --comprise--.

Signed and Sealed this

Fourth Day of September, 1990

Attest:

HARRY F. MANBECK, JR.

*Attesting Officer*     *Commissioner of Patents and Trademarks*